(12) United States Patent
Cavarec et al.

(10) Patent No.: US 9,909,364 B2
(45) Date of Patent: Mar. 6, 2018

(54) METHOD FOR CONTROLLING AN ELASTIC EXTENSIBLE SCREEN HAVING A VARIABLE DEGREE OF OPENING AND SUITABLE CONTROL DEVICE

(71) Applicant: Somfy SAS, Cluses (FR)

(72) Inventors: Pierre-Emmanuel Cavarec, Mont Saxonnex (FR); Eric Lagarde, Sallanches (FR); Serge Neuman, Seynod (FR)

(73) Assignee: Somfy SAS, Cluses (FR)

( * ) Notice: Subject to any disclaimer, the term of this patent is extended or adjusted under 35 U.S.C. 154(b) by 0 days.

(21) Appl. No.: 14/411,956

(22) PCT Filed: Jul. 1, 2013

(86) PCT No.: PCT/EP2013/063781
§ 371 (c)(1),
(2) Date: Dec. 30, 2014

(87) PCT Pub. No.: WO2014/005971
PCT Pub. Date: Jan. 9, 2014

(65) Prior Publication Data
US 2015/0191971 A1     Jul. 9, 2015

(30) Foreign Application Priority Data
Jul. 1, 2012   (FR) ...................................... 12 56302

(51) Int. Cl.
*E06B 9/40*     (2006.01)
*E06B 9/68*     (2006.01)

(52) U.S. Cl.
CPC .................. *E06B 9/68* (2013.01); *E06B 9/40* (2013.01); *E06B 2009/6809* (2013.01); *E06B 2009/6827* (2013.01); *Y02B 80/50* (2013.01)

(58) Field of Classification Search
CPC ............... E06B 9/06; E06B 2009/6809; E06B 2009/6827; E06B 9/40; E06B 9/24; E06B 2009/2417; Y02B 80/50
USPC ........ 160/5, 241, 86, 85, 238, 180, 237, 328
See application file for complete search history.

(56) References Cited

U.S. PATENT DOCUMENTS

| 238,925 | A | * | 3/1881 | Landon | ..................... E06B 9/40 160/241 |
| 957,207 | A | * | 5/1910 | Harrison | ................... E06B 9/40 160/241 |
| 1,068,011 | A | * | 7/1913 | Shmit | ....................... E06B 9/40 160/241 |

(Continued)

FOREIGN PATENT DOCUMENTS

| DE | 10250799 |   | 5/2004 |
| DE | 10250799 | A | 5/2004 |

(Continued)

*Primary Examiner* — Katherine W Mitchell
*Assistant Examiner* — Johnnie A. Shablack
(74) *Attorney, Agent, or Firm* — Haug Partners LLP

(57) ABSTRACT

In order to control the light or air permeability of an elastic extensible screen (1) disposed between an area to be protected and an external area, and having a permeability that varies with a pulling force exerted on the screen, a motorized mechanism (3) adjusts the pulling force on the screen in response to a setpoint signal, which can be determined on the basis of one or a plurality of signals from one or a plurality of sensors (12, 14, 15), in particular light sensors.

19 Claims, 6 Drawing Sheets

(56) References Cited

U.S. PATENT DOCUMENTS

| | | | | |
|---|---|---|---|---|
| 1,158,613 | A * | 11/1915 | Williams | E06B 9/40 160/241 |
| 2,132,986 | A * | 10/1938 | Julien | E06B 9/581 160/265 |
| 2,705,687 | A * | 4/1955 | De Witt | C10B 49/00 128/112.1 |
| 3,065,785 | A | 11/1962 | Taber | |
| 4,105,724 | A * | 8/1978 | Talbot | B01J 19/30 261/112.1 |
| 4,766,941 | A * | 8/1988 | Sloop | E06B 9/24 160/241 |
| 4,815,515 | A * | 3/1989 | Lee | E06B 9/40 160/23.1 |
| 5,001,017 | A * | 3/1991 | Alhamad | A62C 3/06 169/48 |
| 5,249,616 | A * | 10/1993 | Yen | E06B 9/24 160/23.1 |
| 5,287,908 | A * | 2/1994 | Hoffmann | E06B 9/262 160/121.1 |
| 5,467,266 | A * | 11/1995 | Jacobs | H04L 61/2092 160/1 |
| 5,967,788 | A * | 10/1999 | Udoh | G09B 23/04 428/136 |
| 6,161,607 | A * | 12/2000 | de Kimpe | E06B 9/40 160/121.1 |
| 6,915,988 | B2 * | 7/2005 | Sanz | B60J 1/2041 160/23.1 |
| 7,360,575 | B2 * | 4/2008 | Weiss | A47F 3/0469 160/264 |
| 7,977,904 | B2 * | 7/2011 | Berman | E06B 9/32 160/5 |
| 8,418,741 | B2 * | 4/2013 | Cheung | E06B 9/42 160/241 |
| 8,853,973 | B2 * | 10/2014 | Lagarde | E06B 9/68 160/310 |
| 8,919,418 | B2 * | 12/2014 | Carvallo | E06B 9/264 160/180 |
| 8,960,259 | B2 * | 2/2015 | Weston | E06B 9/06 160/23.1 |
| 9,080,382 | B2 * | 7/2015 | Lagarde | E06B 9/68 |
| 9,221,320 | B2 * | 12/2015 | Gaertner | B60J 7/0015 |
| 2007/0184238 | A1 * | 8/2007 | Hockaday | B32B 7/00 428/98 |
| 2008/0163984 | A1 * | 7/2008 | Lambey | E04F 10/02 160/2 |
| 2009/0027759 | A1 | 1/2009 | Albahri | |
| 2012/0031568 | A1 * | 2/2012 | Cheung | E06B 9/42 160/121.1 |
| 2012/0061029 | A1 * | 3/2012 | Weston | E06B 9/06 160/6 |
| 2012/0103540 | A1 * | 5/2012 | Shaffer | E06B 9/24 160/237 |
| 2012/0193041 | A1 * | 8/2012 | Sun | E06B 9/44 160/241 |
| 2015/0247267 | A1 * | 9/2015 | Corey | D03D 19/00 29/897.31 |

FOREIGN PATENT DOCUMENTS

| | | |
|---|---|---|
| DE | 202007013762 U | 1/2009 |
| EP | 0795674 A | 9/1997 |

* cited by examiner

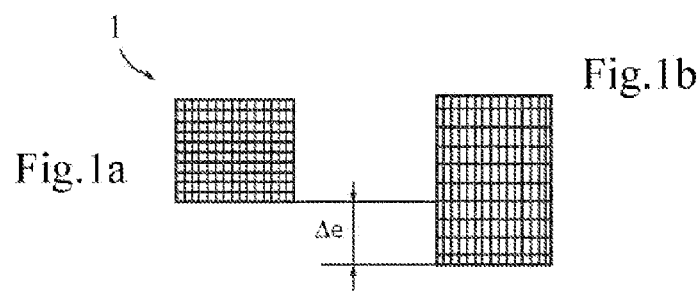
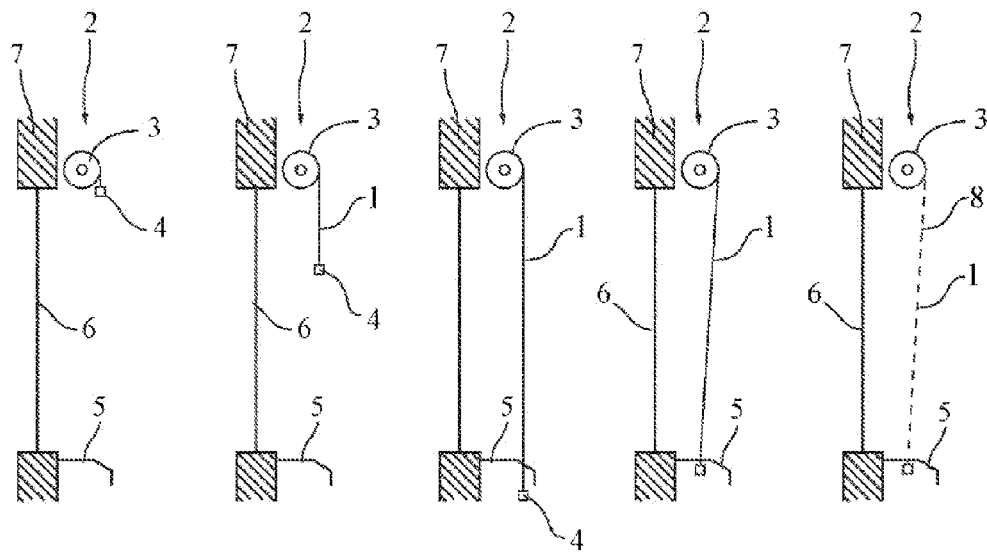

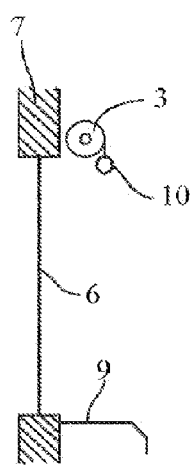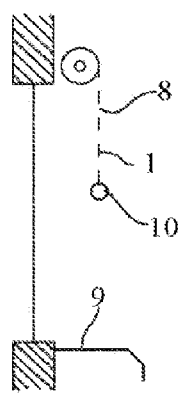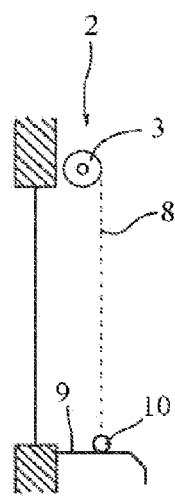
Fig.3a  Fig.3b  Fig.3c  Fig.3d
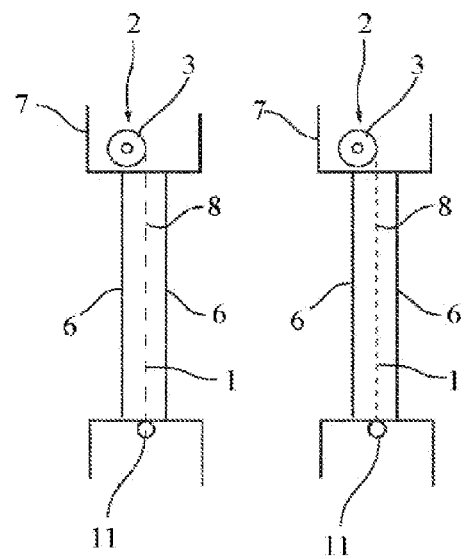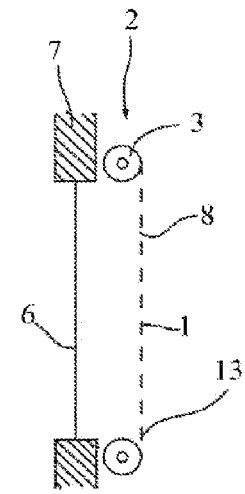
Fig.4a  Fig.4b  Fig.5

METHOD FOR CONTROLLING AN ELASTIC EXTENSIBLE SCREEN HAVING A VARIABLE DEGREE OF OPENING AND SUITABLE CONTROL DEVICE

This application is a 371 of PCT/EP2013/063781 filed on Jul. 1, 2013, published on Jan. 9, 2014 under publication number WO 2014/005971, which claims priority benefits from French Patent Application Number 1256302 filed Jul. 1, 2012, the disclosure of which is incorporated herein by reference.

TECHNICAL FIELD OF THE INVENTION

The invention relates to the control of a screen. The term "screen" will be used here to refer generically to blinds, awnings, canvases, lining curtains or mosquito nets designed to be deployed and retracted, vertically, horizontally or obliquely, in particular to conceal openings in buildings or protect access to such openings, or to protect from outside sun or rain, or to form projection, partitioning or decorative screens. The invention more particularly relates to the control of an elastically extensible screen allowing more or less light and/or air to pass based on a traction to which it is subjected.

BACKGROUND OF THE INVENTION

Motorized screen devices are known making it possible to vary the quantity of light and energy entering through an opening. These are essentially Venetian screens, the orientation of the slats of which varies. It is, however, necessary to note that the incoming quantity follows laws that it is very difficult, if not impossible, to model correctly. It is then necessary to use a light and/or temperature sensor for each indoor space in question and to couple said sensor(s) with the automaton that will orient the slats until obtaining the required quantity of natural light. The other, more rudimentary solution consists of orienting the slats over several predefined positions and coupling that orientation with the azimuth of the sun. One thus obtains good protection in direct radiation, but a poor quality of ambient light and thermal comfort.

Also known are extensible elastic fabrics that allow more or less filtering of the light based on a deformation imposed on them. In fact, the fabrics are made by crossing weft and warp yarns. More or less significant interstices exist between each of the yarns of a same type and also between yarns of different types. These interstices define a porosity that allows light to pass in proportion to the surface area of the interstices. By using weft yarns and/or warp yarns having interlacing and a determined elasticity, it is possible to vary those interstices. The ratio of the surface area occupied by the interstices to the total surface area of the screen is referred to as the aperture ratio of the screen. In the case of an extensible elastic fabric, that aperture ratio varies with the elastic deformation of the screen.

What has been discussed here regarding fabrics can be transposed to other nonwoven screens whereof the structure has interstices or pores. In that case as well, it is possible to define an aperture ratio. When the screen is elastically extensible, the aperture ratio may vary from a minimum value, obtained with no traction force, to a maximum value, beyond which irreversible deformations may occur.

As indicated, the aperture ratio is generally used to characterize the higher or lower opacity of a woven or nonwoven screen. The aperture ratio is expressed in percentage. It is possible to obtain very low aperture ratios, i.e., close to 0% and in any case below 5%, for opaque screens, and aperture ratios of approximately 15% to 20% for traditional screens that have a sun protection effect. Past that, no further sun protection is obtained, and reference is instead made to decorative screens. For example, an aperture ratio of approximately 40% corresponds to a casement curtain. The aperture ratio may, however, also be used to characterize the capacity of the screen to allow air to pass.

It has been proposed in document EP 0,795,674 A2 to use a woven or nonwoven screen with a variable aperture ratio to conceal an opening of a building. The screen is fastened by one end to a winding tube and by the opposite end to a load bar. A mechanism makes it possible to unwind or wind the screen around the tube to close or free the opening. This mechanism further makes it possible to stretch the extensible screen, which results in increasing the translucency thereof, or to relax it, which has the opposite effect of increasing its opacity. To that end, the mechanism makes it possible to lock the position of the load bar, before acting on the roller to stretch the screen. The screen is preferably extensible in only one direction. It is preferably woven. However, the proposed mechanism is not motorized, which means that the user must measure the traction to be exerted to obtain the desired translucency. Another screen of the same type is described in document U.S. Pat. No. 3,065,785, with the same limitations.

BRIEF DESCRIPTION OF THE INVENTION

The invention aims to resolve the drawbacks of the state of the art and to propose means making it possible to finely vary the light and/or air permeability of an extensible elastic screen.

According to a first aspect of the invention, this relates to a method for controlling the light and/or air permeability of an extensible elastic screen arranged between a zone to be protected and an outer zone, the screen having a permeability varying with a traction force exerted on the screen, characterized in that a motorized mechanism modifies a traction force on the screen in response to a setpoint signal.

Using a motorized mechanism does away with the difficulties encountered with manual adjustment. Traction forces of the screen are maintained without difficulty and precisely such that the aperture ratio of the porosities of the screen is completely controlled.

The setpoint can be provided by the user actuating an electric command. Preferably, however, the command of the motorized mechanism is automated. To that end, and according to one preferred embodiment, the setpoint signal depends on one or more signals coming from one or more sensors.

For an application to management of the brightness or solar radiation in the zone to be protected, the sensor(s) may comprise at least one sensor detecting the light intensity in the zone to be protected and/or in the outer zone. The sensor may be positioned remotely with respect to the screen in the observed zone, or on the screen. In the latter case, the sensor can be positioned on the side of the zone to be protected and oriented so as to detect the brightness in the zone to be protected. It may also be alongside the screen on the side of the zone to be protected, but oriented so as to detect the light passing through the screen, thereby providing a direct local measurement of the aperture ratio. Inasmuch as the elastic screen deforms uniformly, the local measurement is representative of the entire screen.

The setpoint signal can also depend on one or more signals coming from one or more thermal sensors positioned in the zone to be protected and/or the outer zone.

A digital model can be used connecting the aperture ratio of the screen to its deformation (its elongation) and/or the exerted traction force. This model can for example be a simple empirical linear module yielding a proportionality rule between aperture ratio and elongation, or between aperture ratio and traction force. Thus, the setpoint signal may in particular be a signal proportional to a traction force to be exerted on the screen, or a deformation to be exerted on the screen. Corrective factors can be contributed to account for the creep and more generally aging of the material making up the screen, which may in particular modify its stiffness (the law connecting the elongation or the variation of the aperture ratio of the porosities to the traction force) or cause permanent deformations (modifying the value of the aperture ratio without bias). The model can be configured to account for the dimensions of the screen or other parameters. The model can, if applicable, be nonlinear, in particular if the variation range of the aperture ratio is significant.

The brightness and/or temperature signals can be used to determine a target value for a desired aperture ratio, corresponding via the model to a setpoint of a traction force or a deformation of the screen. The setpoint signal may thus in particular be proportional to a target brightness in the zone to be protected. It will then be possible to drive the motorized mechanism so as to obtain the targeted traction force or deformation. This driving may preferably be done in a closed loop by comparing the setpoint value with a motor torque or a rotation of the drive shaft or with any other measured variable representative of the traction force or the elongation.

Alternatively, it is also possible to use a light signal coming from the zone to be protected as feedback.

Furthermore, the sensor(s) may comprise at least one torque sensor, in particular one motor torque and/or position sensor for a winding tube of the screen.

The command may also call on a strain measurement sensor associated with the screen in determining the elongation or deformation of the screen.

According to one embodiment, the method comprises a prior step for motorized deployment of the screen from a retracted position to a deployed position.

An approach may be used such that during the prior deployment step, the screen has a maximum deformation, or a predetermined deformation sufficient to significantly increase its aperture ratio relative to the minimum value without deformation. In so doing, it is possible to limit the contrast introduced by the deployment of the screen.

Alternatively, an approach may be adopted such that during the prior deployment step, the screen is not subjected to a noteworthy traction force, such that it has a null or minimal deformation. This option offers the advantage of simplicity of implementation.

According to another aspect of the invention, this pertains to a device for controlling permeability through an opening between a zone to be protected and an outer zone, comprising an extensible screen having a permeability varying with a traction force exerted on the screen, and a motorized mechanism to adjust the traction force on the screen in response to a setpoint signal and thereby modify the permeability of the screen.

The device may be controlled manually, but it preferably comprises automated control for the motorized mechanism to generate the setpoint signal.

Preferably, the device further comprises at least one brightness sensor connected to the automation mechanism, to measure a brightness intensity in the zone to be protected and/or in the outer zone. This sensor can be positioned away from the screen in the observed zone. It can also be incorporated into the screen and turned toward the observed zone. Lastly, and particularly advantageously, the brightness sensor can be alongside the screen in the zone to be protected and oriented toward the outer zone so as to detect the light passing through the screen. Naturally, several sensors of the same type or different types can be used. The control automation preferably comprises a law programmed to determine the setpoint value as a function of the signals coming from the brightness sensor(s), and if applicable other sensors.

According to one embodiment, the device comprises a winding tube to wind and unwind the screen between a wound position and a deployed position, the motorized mechanism being a mechanism for driving the winding tube, driven by a rotating actuator that can in particular be a direct current electric motor or a brushless motor, offering the advantage of precise driving at low speeds.

According to one embodiment, the device further comprises a load bar positioned at one free end of the screen. The load bar can have a mass such that, suspended from the free end of the screen, it causes a predetermined traction force sufficient to cause, during deployment, a noteworthy deformation of the screen and a substantial increase of the aperture ratio above the minimum value. The device can comprise a support stop for stopping the load bar in the deployed position of the screen, which prohibits the movement of the load bar beyond the deployed position and makes it possible to modulate the traction force in the deployed position.

The device may have a bolt to lock the load bar in the deployed position.

The winding tube can be positioned in the load bar.

According to one preferred embodiment, the device comprises two winding tubes connected to two opposite ends of the screen. A connecting strap can be used to connect one of the two winding tubes to one of said ends of the screen.

It is also possible to consider the motorized mechanism comprising at least one linear actuator, for example connected to the load bar, to exert a traction force at least at one end of the screen, to replace the winding tube(s). This solution will be particularly interesting when the screen is not designed to be retracted, but remains in place in front of the opening.

BRIEF DESCRIPTION OF THE FIGURES

Other features and advantages of the invention will emerge from reading the following description, in reference to the appended figures, which illustrate:

FIGS. 1a and 1b, diagrammatic views of a screen with a variable aperture ratio based on a traction force applied to the screen;

FIGS. 2a to 2e, diagrammatic views of a device according to a first embodiment of the invention, in the wound position (FIG. 2a), deployed position (FIGS. 2c to 2e) and an intermediate position (FIG. 2b);

FIGS. 3a to 3d, diagrammatic views of the device according to a second embodiment of the invention;

FIGS. 4a and 4b, diagrammatic views of a device according to a third embodiment of the invention;

FIG. 5, a diagrammatic view of a device according to a fourth embodiment of the invention;

For greater clarity, identical elements will be identified by identical reference signs in all of the figures.

DETAILED DESCRIPTION OF THE INVENTION

Figure 6:
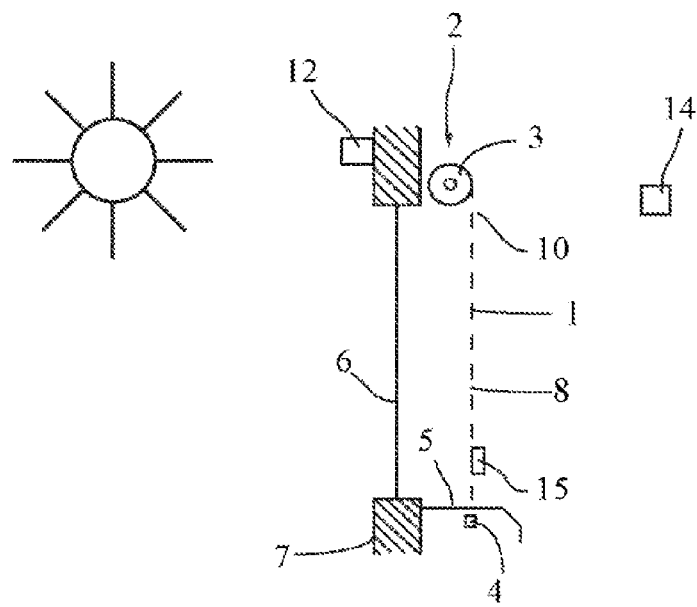
FIG. 6, a diagrammatic view of certain components of an automation mechanism associated with the preceding devices.
Figure 7:
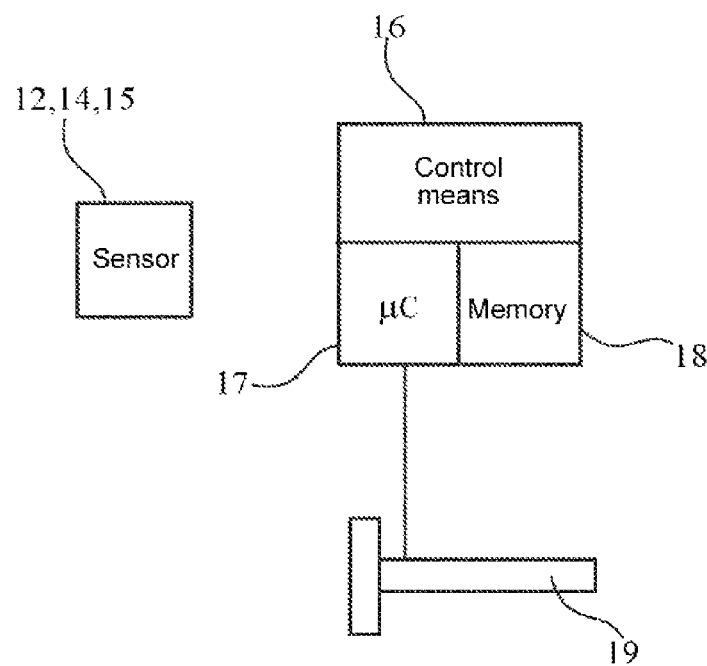
FIG. 7, a diagrammatic view of the automation mechanism.

FIGS. 1a and 1b show a woven screen such that when traction is applied in a predetermined direction, for example parallel to the warp yarns or parallel to the weft yarns, the geometry of the holes is modified in one direction (warp or weft) while preserving the geometry in the other direction (warp or weft). As illustrated in FIGS. 1a and 1b, an elongation Δe is observed that translates, at the fabric, to a separation of the meshes. The aperture ratio is minimal in the absence of deformation and increases in proportion to the applied traction. The quantity of light and energy (or air) passing through the screen depends on that aperture ratio and varies with it according to a law specific to the screen, which may be determined empirically or based on a model. The same behavior increasing the aperture ratio with a traction force can also be obtained with nonwoven screens. Such screens are for example known under the Screenflex® brand by Hexcelscreen® or the Ombra DLS brand by Copaco®.

FIGS. 2a to 2e show a device 2 for controlling the permeability of a screen 1 of the preceding type, according to a first embodiment. The screen 1 is initially wound on a winding tube 3 driven by a motor, preferably housed in the winding tube 3. A load bar 4 is arranged at one free end of the screen. The device is arranged across from an opening, in the case at hand a glass opening 6, in a wall 7 of a building, the glass 6 and the wall 7 separating a zone to be protected, where the device is located, from an outer zone. The zone to be protected can for example be a room located inside a building. The outer zone may be another room or a zone situated outside the building. The two zones can also be situated in the same room. The device is completed by a bolt 5, arranged at the threshold of the glass opening 6. Said bolt 5 cooperates with one end of the load bar 4 that protrudes past the lateral rim of the screen 1.

During its deployment, illustrated in FIGS. 2b and 2c, the screen has a minimal aperture ratio, for example zero if the load bar 4 is light enough. In FIG. 2d, the bolt locks the load bar 4 in the deployed position. The locking can for example be caused by an upward movement priming of the load bar, or by an independent actuator.

Once the load bar is locked, it becomes possible to exert traction on the screen, while keeping the load bar immobile owing to the bolt, and while simultaneously driving the winding tube with the motor in the winding direction of the screen, as illustrated in FIG. 2e. By controlling the traction exerted on the screen using the winding tube, the porosity 8 and the aperture ratio of the screen 1 are modified in an operating range that can for example vary between 0% and 40%, or preferably between a lower bound comprised between 0% and 3% and an upper bound comprised between 15 and 20%, to remain in the range corresponding to solar protection. To raise the screen, it is first necessary to cancel the traction exerted by the winding tube 3, before releasing the load bar 4 by actuating the bolt 5. It should be noted that in opacification phases, the elasticity of the material making up the screen is used, which, by elastically returning to its unbiased state, closes the porosities 8 again.

FIGS. 3a to 3d show a device according to a second embodiment of the invention, which differs from the previous embodiment in that the load bar has a sufficient mass to cause a significant predetermined deformation of the screen. During its deployment, in FIGS. 3b and 3c, the screen therefore offers a high aperture ratio, preferably greater than 10%, for example approximately 15 to 20%. At the end of deployment, the load bar rests on a support 9 making up an end-of-travel stop. By continuing to drive the winding tube with the motor in the unwinding direction, the traction exerted on the screen is gradually decreased, until a minimum aperture ratio is obtained that is preferably below 5%, or even close to 0%, as illustrated in FIG. 3d.

This embodiment offers the advantage, relative to the previous version, of making it possible to continuously increase the darkening of the zone to be protected from the wound position of FIG. 3a to the position with a minimum aperture ratio in FIG. 3d. Thus, the user obtains the quantity of light required for comfortable use of the room without having to go through a phase with no light in the room. The quantity of light is such that raising if it is necessary to raise the screen, the rotation of the winding tube will first place the screen under tension by opening the porosities, until reaching a maximum value when the load bar begins to lift from its support and rise with the screen. Here again, the raising will be done with a maximally open porosity and therefore a particularly advantageous natural light contribution.

According to one alternative, it is possible to combine the embodiments of FIGS. 2a to 2e and 3a to 3d, by providing a massive load bar 10 having a sufficient mass to cause a significant deformation of the screen, but also providing that that load bar is locked in the deployed position, such that it is possible, in that position, either to decrease the traction exerted on the screen by continuing to unwind it, or to increase the traction beyond what is allowed by the weight of the load bar by winding the screen. The bolt must in that case be two-directional, i.e., prevent the movements of the load bar in the deployment direction and in the winding direction. It is for example possible to incorporate the electromagnet locking the load bar 10 into the support 9 of FIGS. 3a to 3d. The mass of the load bar 10 will then be able to be chosen so as to be substantially at the middle of the desired deformation range. It will for example be possible to target an aperture ratio of approximately 5% to 10% obtained using the mass of the load bar 10 on the fully deployed screen just before bearing on the support 9, for a variation range of the aperture ratio extending from 0% to 15 or 20%.

According to another alternative, the winding tube and the motor can be positioned in the load bar. This will be particularly interesting if one wishes for the weight of the load bar to contribute to the deformation of the screen.

As illustrated in FIGS. 4a and 4b, the device can be placed between two glass panes of a window. In that case, it is possible to provide either a deployable screen as in the embodiment previously illustrated, or preferably a screen whose free end 11 is stationary, the motorized winding tube 3 only being intended to vary the traction exerted on the screen, but not to raise it. In fact, in that case, the screen is not physically accessible by the user, and the risks of malfunction should be limited by limiting the movement range of the screen. In that case, a screen will preferably be chosen able to reach a very high aperture ratio under traction and reversibly, for example approximately 40%, the screen being intended to replace a casement curtain. The variation range of the aperture ratio may for example be between 20% and 40%. In this embodiment, it is also possible to consider replacing the motorized winding tube with a bar moved linearly in the traction direction by a linear actuator.

It is also possible to consider adopting this embodiment for windows that are not rectangular. There are in fact window shades with an upper part having an oblique contour (for triangular windows, for example) or a curved contour. In that case, it is possible to use a screen cut to the shape and dimensions of the window. The screen is next placed permanently in front of the window, this time with the winding tube on the lower part being horizontal and with a load bar positioned on the upper part and following the upper perimeter of the opening. The opening ratio of the screens is then adjusted by winding the screen from the bottom, which will adjust the brightness level in the room. In order to have a uniform aperture ratio in the most used form, it will be possible to cut the tension screen with the appropriate stress for the desired aperture ratio. Thus, in position, the opening will be completely uniform for the most common usage scenario. Here again, a linear actuator may be used in place of a winding tube driven in rotation.

According to the embodiment illustrated in FIG. 5, two winding tubes 3 and 13 are placed at the ends of the screen. In that configuration, the traction of the screen is exerted by the two ends. Inasmuch as, like the previous embodiment, the screen cannot be retracted, a screen will preferably be used whose aperture ratio can vary significantly, for example between 0% and 40%, i.e., from total permeability to quasi-complete transparency. Motorized winding tubes can be replaced by bars driven by linear actuators in the traction direction.

Another solution consists of being able to wind the screen completely on a first of the two winding tubes 3, 13 and connect the free end of the screen to the second winding tube by straps that will make it possible to guide and pull the screen toward the second tube. The straps are preferably arranged in lateral guides that do not close off the opening and remain invisible to the user. In a position not fully deployed, it suffices to lock the first tube and drive the second to cause the aperture ratio to vary. It is also possible to vary the aperture ratio dynamically by controlling the speed differential between the two tubes during deployment or retraction.

In this configuration with double winding, the first tube can be arranged above the second, in which case the screen deploys conventionally from top to bottom. It is also possible to arrange the first tube below the second, which makes it possible to reverse the operation while having a development of the screen from the bottom and straps fastened to the upper part. Thus, it is possible to position the screen at an intermediate height below which the screen obstructs the rays of the sun, and above which the light can penetrate unhindered and offer enough light in the room to avoid the use of artificial lighting.

Likewise, this solution with double winding is compatible with a use with lateral movement or horizontal movement such as on a pergola, or a movement on any slope, such as a veranda roof.

The rotation of the motorized winding tube(s) can be controlled directly by the user intervening by means of a user interface such as a switch with two or three positions.

It is, however, possible to add to the device, in all of the discussed embodiments, an automation mechanism for enslavement to variables of the outside environment, for example the brightness in the outer zone or the temperature in the zone to be protected. The aim is to minutely subjugate the tension of the screen to a predetermined scenario, for example depending on an outside sunshine level or inside brightness level.

In the first case, it is possible to arrange a brightness sensor 12 outside the building to determine the sunshine level, as illustrated in FIG. 6. If that level is high, it will be necessary to put the screen 1 in position and adjust the porosity 8 until an inside brightness level is obtained that is comfortable for the user.

To that end, the sunshine sensor is connected to a control module 16 comprising a microcontroller 17 able to receive the information from the sensor and interpret it. This signal can simply be an all or nothing signal when the sensor is triggered only upon passage past a threshold. The sunshine information, whether in the form of a threshold or a value, may be crossed with theoretical information related to the time of day. For example, in the case of a morning time, it may be concluded that the windows of the building with an eastern exposure will experience direct sunshine, while the windows on the west side will be in the shade of the building and the incident light will be much less bothersome for users. This orientation and current time information is easy to incorporate into the microcontroller 17 and associated memory 18.

An inside brightness sensor 14 can also be used, either alone or in combination with the sunshine sensor 12. The sensor 14 is placed in the room in any location. In fact, the opening of the porosities of the screen 1 being uniform over the height of the screen, the distribution of the light passing through the screen is regular. In particular, the brightness gradient essentially depends on the distance to the window. Consequently, knowing the distance separating the sensor 14 from the window 6, it is possible to calibrate the device to what one wishes to obtain.

This type of inside brightness sensor 14 can also be suitable for managing artificial light. Thus, the automation mechanism will be able to manage the light inside the room using two means, i.e., solar protection and artificial light.

It is also possible to use a brightness sensor 15 onboard the screen 1. It may be positioned on the screen in a zone permanently in front of the glass pane 6 when the screen is deployed and on the side opposite the glass pane 6 relative to the screen. The brightness sensor 15 can be oriented so as to detect the brightness in the zone to be protected. In that case, it behaves like the sensor 14 previously described. Alternatively, the sensor 15 can be oriented so as locally to detect the brightness passing through the screen. In that position, the brightness sensor 15 receives radiation depending on the aperture ratio of the porosities of the screen. Thus, it is possible to determine the precise aperture ratio. In the case at hand, the sensor 15 can also replace the outside sunshine sensor 12. The communication between this sensor and the control means 16 can be done either via a radio link, which allows complete positioning freedom, or by a wired link that can be superimposed on the screen or directly woven with the rest of the screen (one of the threads used can conduct electricity). Likewise, it is possible to consider a strain measurement sensor fastened to the screen delivering a signal representative of the elongation of the screen, therefore of the porosity 8 and the corresponding aperture ratio.

Whatever the case may be, the microcontroller 17 interprets the received signal to determine the aperture ratio of the porosities 8 of the screen that must be applied for a given window.

When the required aperture ratio is known, the microcontroller 17 sends an order to the motor(s) 19. That order results in starting the motor.

The problem that then arises is knowing when to stop the motor 19 so that the position of the screen 1 is appropriate. To that end, the motor may for example have either a position counting system or a system for measuring the torque at the driving tip of the motor.

In fact, the enslavement can be done in terms of position or torque.

In the case of position enslavement, it is necessary to know the number of revolutions performed by the motor 19 starting from a given position. Counting the revolutions or revolution portions performed makes it possible to determine the movement done by the screen 1 and therefore first to determine the position of the load bar 4 in the event of lowering or raising of the screen, then to determine the elongation of its tension and therefore its aperture ratio once the load bar is in position. In fact, there is a direct relationship between the movement of the screen 1 and its tension when it is in position in front of the opening to be closed off 6. The counting devices are devices known in solar protection actuators.

In the case of torque enslavement, it is necessary to measure the torque exerted on the output shaft of the motor 19 to determine the traction force exerted on the screen 1. This tension being directly related to the aperture ratio of the porosities 8 of the screen 1, it is possible to enslave that aperture ratio with respect to the measured sunshine level. For devices where the screen 1 must first be positioned before it is possible to manage the opening or closing of the porosities 8, it is possible to detect a drop-off on the torque curve as a function of time. In fact, when the screen 1 is lowered, its weight pulls on the winding tube 3 and consequently on the shaft of the motor 19. When the load bar 4 reaches its bearing point, the force exerted by the screen decreases and a relaxation of the stress can be measured at the motor shaft 19.

In the case where the screen 1 lowers, then rises to be locked on locking devices 5 (embodiment of FIGS. 1a to 1e), position enslavement appears preferable because it makes it possible to determine the position of the screen to attach it in the locking devices 5. It is nevertheless possible to consider an accumulation of the elements: a measurement of the distance traveled to identify the position of the load bar before raising in the locking system, and torque measurement to manage the tension enslavement of the screen and therefore the aperture ratio of the porosity.

In the case where the device 2 is not definitively in place with these ends in position, but on the contrary it is necessary to set the screen 1 in motion so that it puts itself in place, an installation procedure is provided. This procedure consists of determining the ends of travel in either direction. For example, the extreme upper position is determined so as to avoid winding the entire screen 1, and/or the extreme lower position is determined to stop unwinding of the screen 1 in the correct location. This operation in principle can only be done once the device 2 is in place, because it depends on the installation location. Some of these limits can be determined automatically. For example, in the case of the massive load bar 10, driving forces from the motor 19 on the lowering vary when the load bar 10 reaches its bearing point 9. Thus, a strong variation on one parameter of the motor 19 can be measured that will determine the lower end-of-travel limit. This parameter may be the power supply current of the motor 19, or a torque measurement if the motor 19 has a sensor.

A problem may exist in the screen portion 1 situated on the winding tube 3 during unwinding of the screen 1 under a load. The screen 1 is elastic by definition. When it is positioned on the tube, it may be stressed, and it therefore risks sliding while winding on the tube. This phenomenon may be problematic, because it disrupts the measurement of the movement of the screen 1. In fact, it is necessary to associate that movement with the opening or closing of the porosities 8 of the screen 1. This additional movement deceives the enslavement. This phenomenon will not be bothersome when there is no enslavement and the user controls the blinds 2 directly, or when there is enslavement but with an inside sensor capable of determining whether the ambient brightness is adequate.

A first method for offsetting this sliding is to know it and factor it into the opening calculation of the porosity of the screen 1. Thus, the movement measured at the tube will also incorporate the movement of the screen portion 1 at most for the total extension percentage of the screen 1. For example, if the extension is 10% for a fabric 1 with a total height of 3 meters, the quantity of wound screen 1 is 30 cm and the light can only pass over 2.70 m the screen 1 in unstretched equivalent. It will be missing 10% relative to the expected light passage quantity. The equivalent opening will therefore not be 10%, but 9%. An additional tension of approximately 1% will therefore need to be provided. This calculation is simplified, as it does not take the friction coefficient of the screen 1 on the tube into account, which will tend to decrease the error.

In this case, the characteristics of the screen 1 will have to be entered into the control means beforehand in order to be able to make the corrections.

Figure 8:
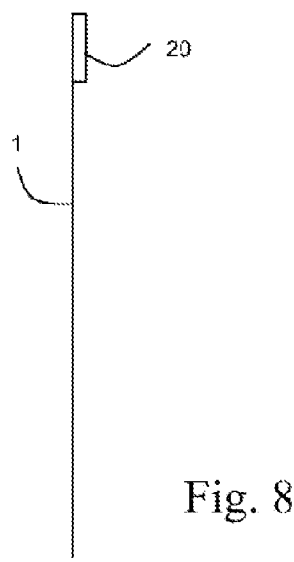
FIG. 8, a diagrammatic view of a screen according to a fifth embodiment of the invention.

Another solution to this problem, illustrated in FIG. 8, consists of adding an overcanvas 20 on the end of the screen 1, for example made from polyester, that is not extensible. This overcanvas 20 is fastened on the upper end of the screen 1. Two fastening bands can be used: the first between the upper end of the screen 1 and a border of the overcanvas 20, the second between the other border parallel to the first of the overcanvas 20 and the screen. The first fastening is done at the same time as the fastening of the screen 1 to the cord that is traditionally incorporated into the winding tube 3. These fastening operations can for example be done by sewing or adhesion. It is also possible to adhere the entire overcanvas 20 on the upper end of the screen 1.

The length of this overcanvas 20 corresponds to the possible extension length of the screen 1 between total release and maximum tension. For example, for a canvas three meters high, this may be approximately 45 centimeters. In fact, for a traditional use, the screen 1 will be stretched between 0% and 15%.

The operation with the overcanvas 20 will be as follows: when the blind 2 is placed with the screen 1 not stretched, the entire screen 1 is taken out of the winding tube 3 and is visible. When the user wishes to open the porosities 8, the screen 1 is stretched using the winding of the screen 1 on the tube. Yet, without an overcanvas 20, there is a risk that during this operation, the screen 1 may slide on the winding tube 3 while stretching. With the overcanvas 20 that is not extensible, the screen 1 cannot stretch in that location and there is no more sliding.

Returning to the previous example, the movement of 10%, or 30 cm, is distributed on the remaining screen 1 and therefore on an unwound part of the screen 1. The effective opening is actually that which is expected.

With a same technical effect, it is possible to consider extending the extensible screen 1 by a piece that is not extensible, such that the part that winds during traction of the blind 2 is not extensible.

Another problem may be encountered during the lifetime of the blind 2: aging of the materials. This aging may result in a variation of the stiffness of the screen 1 such that for a same force exerted on the screen 1, the aperture ratio of the porosities 8 will be different if the screen 1 is new, if the fibers of the screen 1 are definitively put in place after an initial usage period, or if the screen 1 is used for several years. This aging can also be measured by a residual deformation of the screen 1, a permanent elongation corresponding to an increase in the minimum value of the aperture ratio.

In the event the motor 19 is equipped both with torque measurement and movement measurement by counting revolutions performed by the winding tube 3, it is possible to identify this aging and apply corrective factors.

Figure 9:
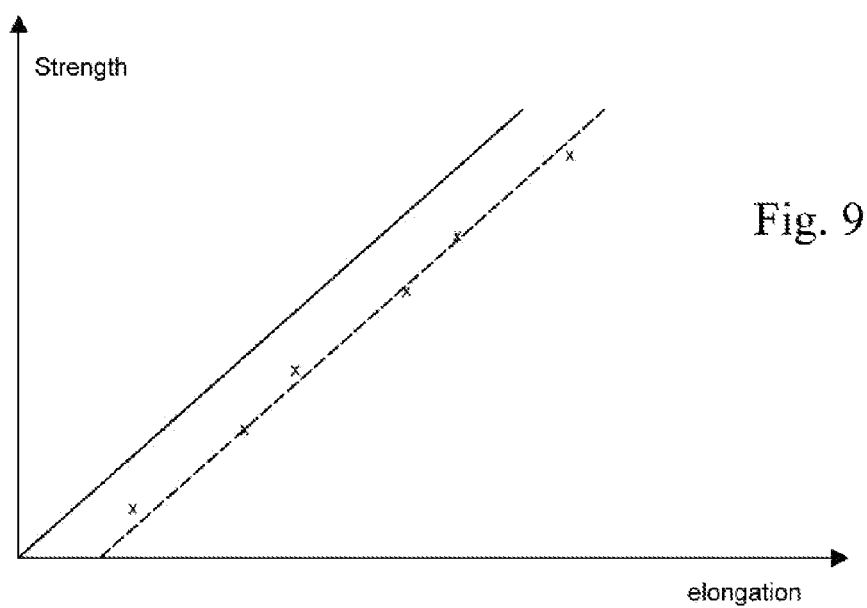
FIG. 9, a characteristic traction/elongation curve of a screen, used by the command automation mechanism.

For example, a regular measurement of the movement and torque values will make it possible to determine the stiffness of the screen 1 in real time, as illustrated in FIG. 9. In fact, these two properties are proportional and depend directly on the stiffness of the screen 1. If the stiffness decreases with time, a correction factor should be applied to a torque enslavement because for a same force, the movement of the fibers will be greater and therefore the aperture ratio will be higher. In the case of position enslavement, this deviation will have no impact, because the aperture ratio will remain the same for a given movement.

In the event there is a permanent deformation of the screen 1, it can be measured in the first usage cases where the blind 2 must first be lowered before being able to vary the aperture ratio of the canvas. One means for measuring it, if one has a torque measurement and a movement measurement, is to record a series of torque/movement values and calculate the slope of the curve connecting those points. At zero torque, the movement calculated from that slope must be equal to the original movement. A value shift (illustrated in FIG. 9) makes it possible to determine the extent to which the screen 1 has deformed.

This value is also decisive for the positioning of the screen at the end of winding travel: if the fabric is deformed, the screen 1 may protrude past the winding tube 3 by a quantity equal to the deformation. The measurement of this deformation can therefore recalibrate the extreme upper position over time.

It is possible to provide that the control device has various learning algorithms implemented during on-site installation.

Figure 10:
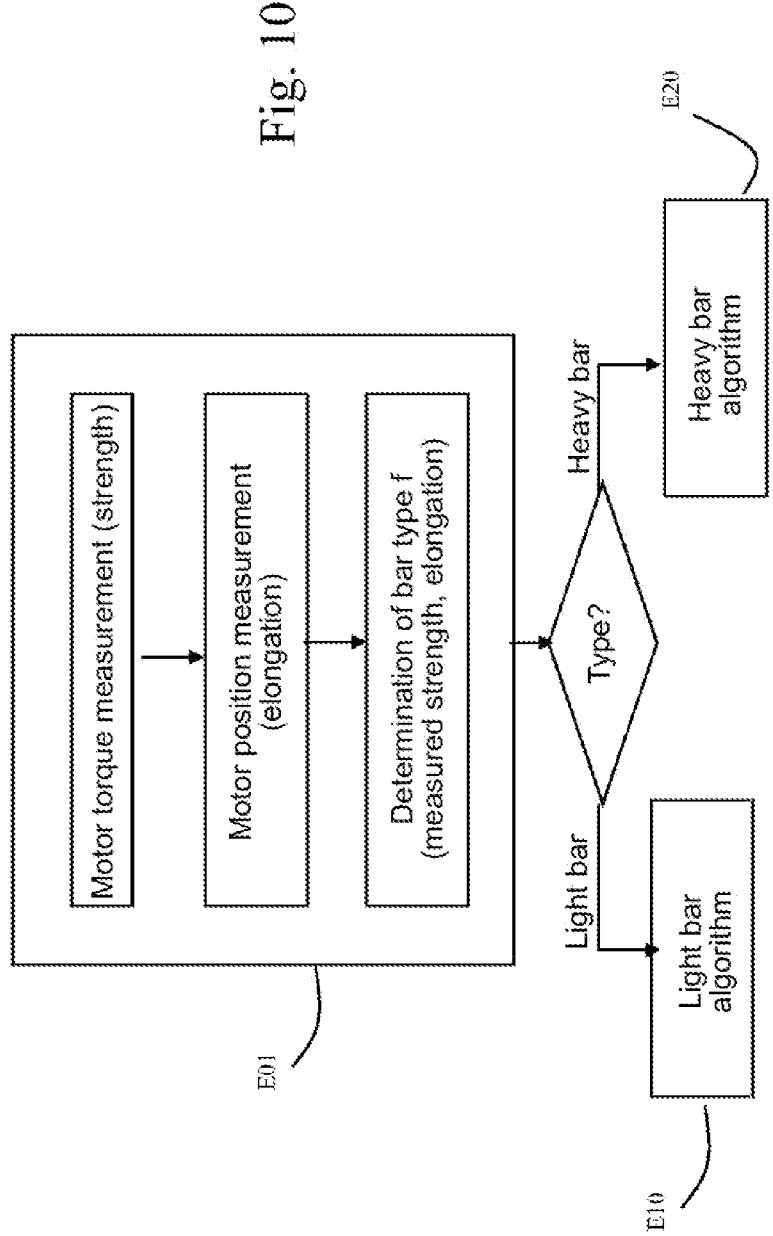
FIG. 10, a learning algorithm for commanding the preceding devices.

In particular, an algorithm allows the intelligence onboard the device to detect whether the assembly is of the light load bar type 4 or massive load bar type 10. This algorithm, illustrated in FIG. 10, calls on motor torque and rotation angle measurements of the motor, to reconstitute the curve of FIG. 9. The motor torque necessary to unwind the screen being lower in the case of a massive bar than in the case of a light bar, and the motor torque necessary to wind the screen on the contrary being higher in the case of a massive bar than in the case of a light bar, observing the curves obtained during unwinding and/or winding makes it possible to deduce the type of bar, or the mass of the bar (step E01). This results in a choice of driving algorithm specific to the case of the light bar (step E10) or that of the massive bar (step E20).

Figure 11:
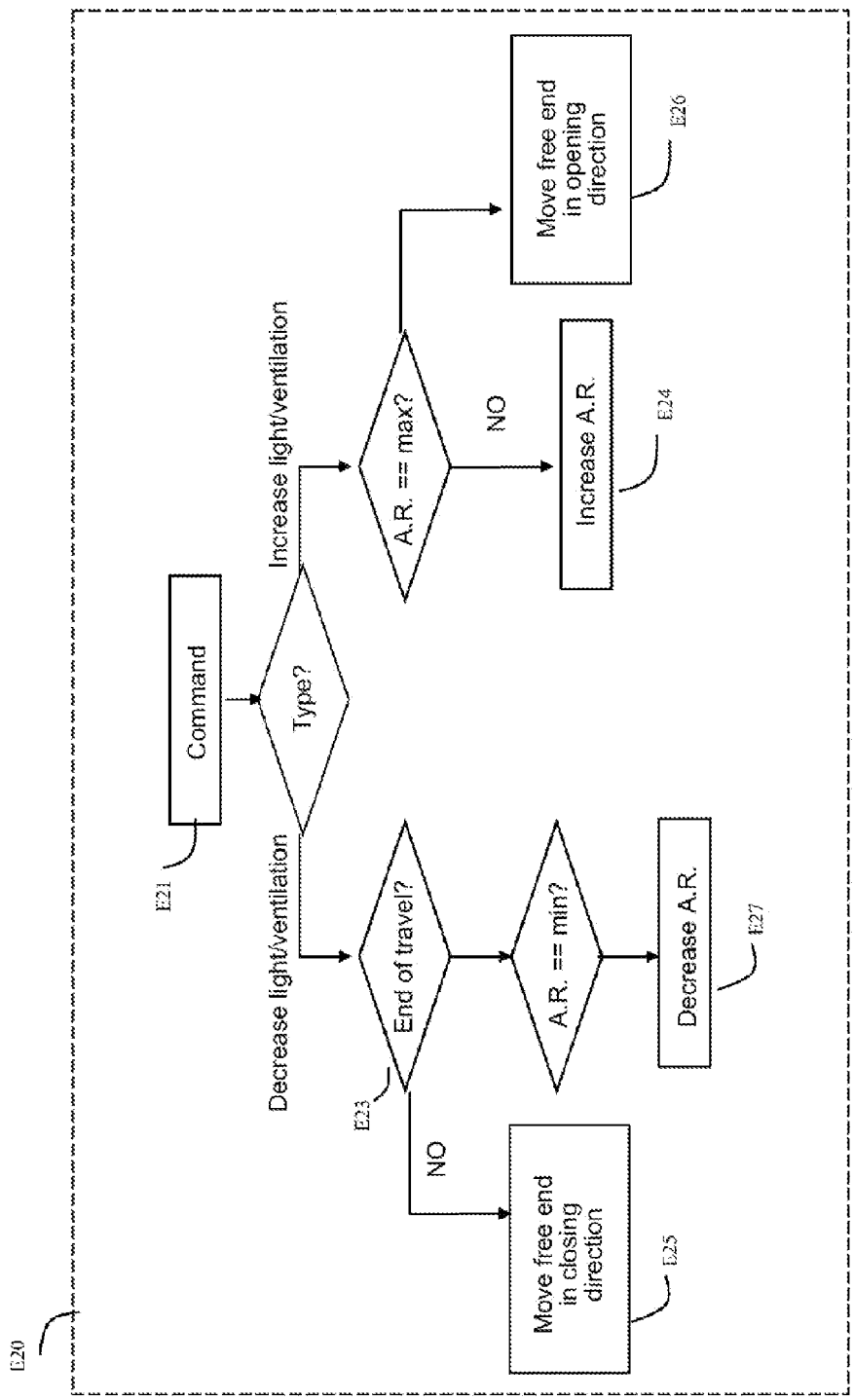
FIG. 11, a command algorithm for the devices of FIGS. 3a to 3d.

In FIG. 11, the algorithm E20 used to drive the massive bar 10 of the embodiment of FIGS. 3*a* to 3*d* has been reconstituted, based on a command to increase or decrease the light (and/or air circulation), received in step E21. This command can be a manual command given by the user on a control interface, or a command coming from the automation mechanism 16 for example to respond to a change in the light detected by the sensors 12, 14 or 15.

If the command is a command to increase the brightness, the microprocessor 17 first determines whether the maximum aperture ratio has been reached. If yes, the microprocessor commands the motor 19 preferably in terms of speed to wind the screen 1 fairly quickly, which results in causing the load bar 10 to rise (Step E26). Otherwise, the microprocessor commands the motor 19 also in the winding direction of the screen, but while driving the motor at a very low-speed torque for maximum precision. The load bar 10 remains in place, while the screen stretches and the aperture ratio gradually increases (Step E24).

If the command is a command to decrease the brightness, the microprocessor 17 first determines whether the end-of-travel position of the load bar 10 on the support 9 has been reached, as previously mentioned (step E23). If yes, the microprocessor determines whether the minimum aperture ratio of the screen has been reached, and in the event it has not been reached, actuates the motor 19 with a torque setpoint to further unwind the screen, which decreases the traction force and closes the pores of the screen (step E27). If the end-of-travel closing position has not yet been reached, if one is therefore in the state of FIG. 3*b*, the microprocessor 17 cannot drive the rotation of the motor 19 in terms of speed to quickly unwind the screen and further lower the load bar 10 (Step E25).

Many other alternatives are considered. One skilled in the art can in particular provide for combining various elements of the various considered example embodiments.

The control automaton for the motor may or may not be onboard the latter.

All of the solutions not using the mass of the load bar for deployment (FIG. 1*a* to 1*e*) or for traction of the screen (FIGS. 3*a* to 3*d*) can be used indifferently with a horizontal or vertical winding tube, to stretch the screen horizontally or vertically, following a vertical, lateral or horizontal movement such as on a pergola, or any slope such as the roof of a veranda.

The embodiments illustrated above can be used so that the screen also serves as a mosquito net, or as means for regulating the quantity of air entering the room. In these cases, the window must be able to be opened independently of the screen. To regulate air intake, the screen can be used in addition to a traditional ventilation means. It can also be considered as a safety element to avoid the penetration of smoke coming from the outer zone into the zone to be protected.

The invention claimed is:

1. A method for controlling an aperture ratio of an extensible elastic screen, the method comprising:
   a) providing a motorized winding tube configured to drive the extensible screen between a wound position and a deployed position;
   b) providing a load bar on a free end of the screen exerting a traction force on the screen;

c) a first step of deploying the screen, wherein the traction force exerted on the free end of the screen by the load bar provides an aperture ratio above a minimum value;
d) a step, after deploying the screen, of resting the load bar on a support; and
e) a step of gradually decreasing the traction exerted on the screen by the load bar by driving the winding tube in an unwinding direction, while the load bar rests on the support,
wherein the traction force on the extensible screen is adjusted in response to a setpoint signal.

2. The control method according to claim 1, wherein during the first step, the load bar provides an aperture ratio of the screen of a maximum value.

3. The control method according to claim 1, wherein the setpoint signal depends on one or more signals coming from one or more sensors.

4. The control method according to claim 3, wherein the one or more sensors comprise at least one brightness sensor detecting a light intensity in a zone to be protected.

5. The control method according to claim 3, wherein the one or more sensors comprise at least one sensor alongside the screen and oriented so as to detect light passing through the screen.

6. The control method according to claim 3, wherein the setpoint signal depends on one or more thermic signals coming from one or more thermal sensors.

7. The control method according claim 3, wherein the setpoint signal is a signal proportional to a target traction force to be exerted on the screen.

8. The control method according claim 3, wherein the setpoint signal is a signal proportional to a deformation to be exerted on the screen.

9. The control method according to claim 3, wherein the setpoint signal is a signal proportional to a target brightness in a zone to be protected.

10. The control method according to claim 3, wherein the one or more sensors comprise at least one brightness sensor detecting a light intensity in the outer zone.

11. The control method according to claim 3, wherein the one or more sensors comprise at least one brightness sensor detecting a light intensity in a zone to be protected and at least one brightness sensor detecting a light intensity in an outer zone.

12. A device, comprising:
an extensible screen, and
a motorized mechanism driving a winding tube,
wherein the extensible screen is wound on the winding tube between a wound position and a deployed position,
wherein a free end of the extensible screen is provided with a load bar,
wherein the load bar exerts a traction force on the screen and provides an aperture ratio of the extensible screen above a minimum value during deployment,
a support stop, wherein the load bar rests on the support stop when the extensible screen is in the deployed position, and
wherein the motorized mechanism adjusts the traction force on the screen in response to a setpoint by driving the winding tube while the load bar rests on the support stop.

13. The control device according to claim 12, comprising an automation mechanism for the motorized mechanism to generate the setpoint signal.

14. The device according to claim 12, comprising at least one brightness sensor connected to the automation mechanism.

15. The device according to claim 14, wherein the brightness sensor is alongside the screen in the zone to be protected and oriented so as to detect the light passing through the screen.

16. The control device according to claim 12, wherein the load bar has a mass that causes a predetermined traction force at the free end of the screen sufficient to significantly increase the permeability of the screen compared to a minimum permeability without deformation of the screen.

17. The control device according to claim 12, wherein the device has a bolt to lock the load bar in the deployed position.

18. The control device according claim 12, wherein the winding tube is positioned in the load bar.

19. The control device according to claim 12, further comprising a second winding tube, the second winding tube connected to the free end of the screen.

\* \* \* \* \*